J. HOBSON, Jr.
CULTIVATOR.
APPLICATION FILED FEB. 24, 1909.

941,678.

Patented Nov. 30, 1909.
2 SHEETS—SHEET 1.

Witnesses
Theo. Rosemand
J. A. L. Mulhall

Inventor
John Hobson Jr,
By Joshua R. H. Potts
Attorney

J. HOBSON, Jr.
CULTIVATOR.
APPLICATION FILED FEB. 24, 1909.

941,678.

Patented Nov. 30, 1909.
2 SHEETS—SHEET 2.

Witnesses
Theo. Rosemand
J. A. L. Mulhall

Inventor
John Hobson Jr.,
By Joshua R. H. Potts
Attorney

UNITED STATES PATENT OFFICE.

JOHN HOBSON, JR., OF WAYNE, PENNSYLVANIA.

CULTIVATOR.

941,678.

Specification of Letters Patent.  Patented Nov. 30, 1909.

Application filed February 24, 1909.  Serial No. 479,734.

*To all whom it may concern:*

Be it known that I, JOHN HOBSON, Jr., a citizen of the United States, residing at Wayne, in the county of Delaware and State of Pennsylvania, have invented certain new and useful Improvements in Cultivators, of which the following is a specification.

My invention relates to an improved cultivator, and more particularly to a hand cultivator designed to be moved along the ground by a person walking behind the same, the object of the invention being to provide improved mounting, and means for driving rotary gangs of cultivator teeth at opposite sides of a central gear containing casing, enabling the number of such gangs to be varied to suit conditions.

A further object is to provide improved means for regulating the depth of cultivation, improved means for driving the cultivators, and improved means for compelling the turning of said cultivators in one direction only.

With these and other objects in view, the invention consists in certain novel features of construction, and combinations and arrangements of parts as will be more fully hereinafter described and pointed out in the claims.

Figure 1:
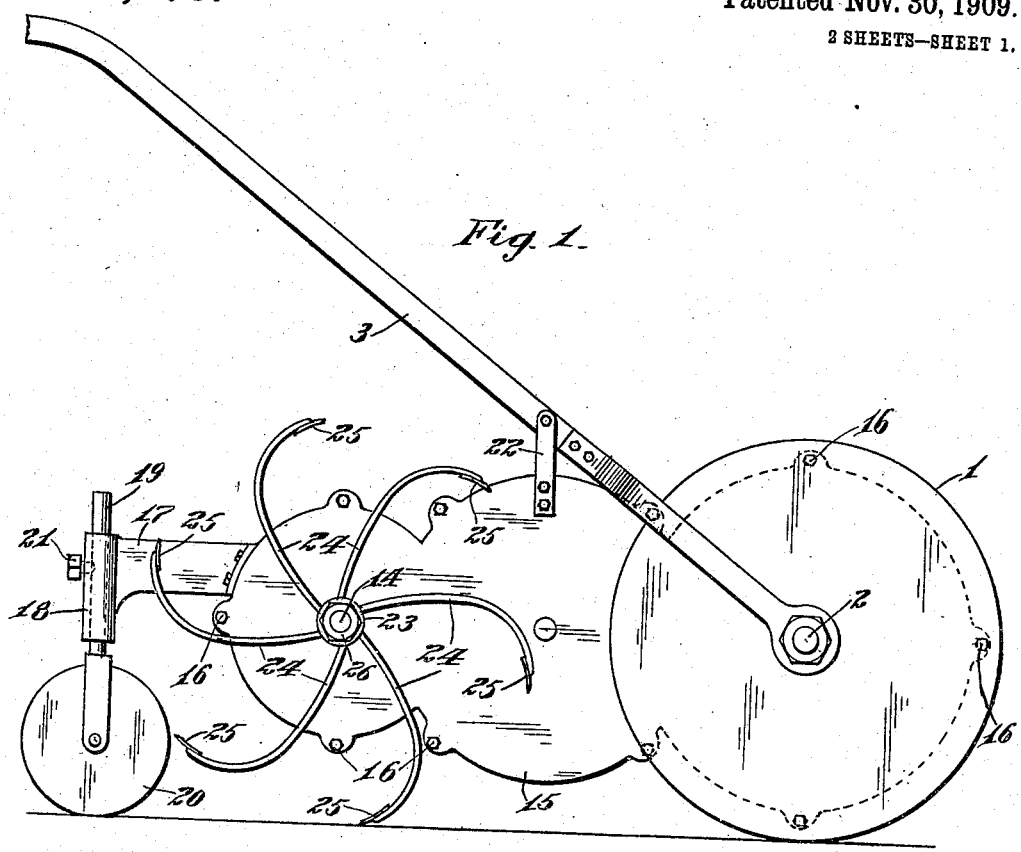
Figure 2:
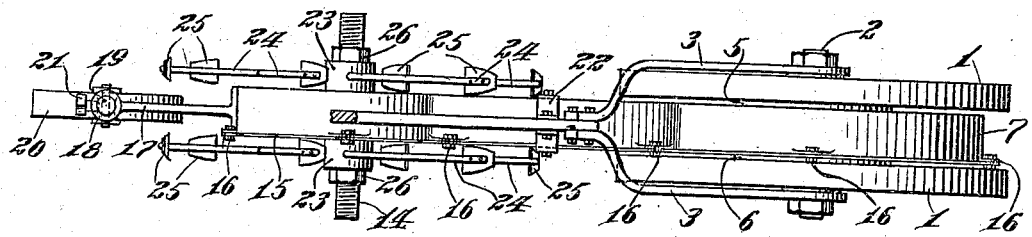
Figure 3:
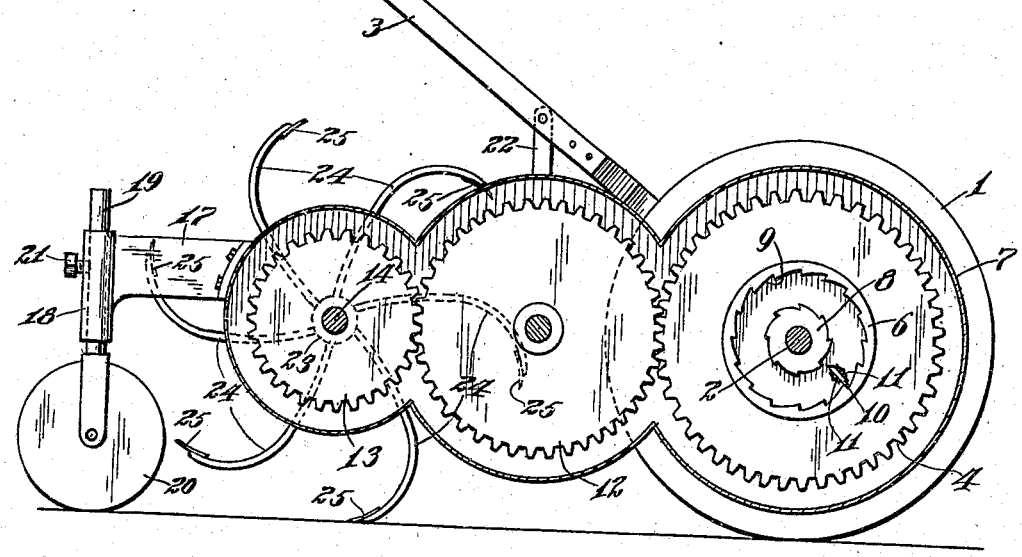
Figure 4:
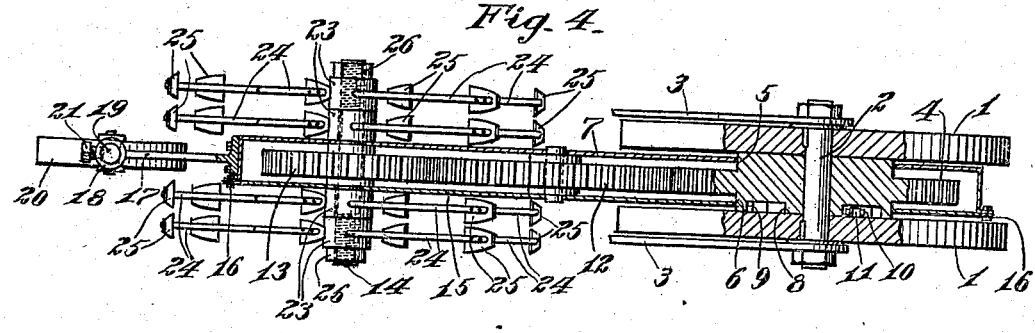

In the accompanying drawings, Figure 1, is a view in side elevation illustrating my improvements. Fig. 2, is a top plan view. Fig. 3, is a view in longitudinal vertical section, and Fig. 4, is a view partly in horizontal section and partly in plan.

1, 1, represent traction wheels keyed to a short shaft 2, to which latter a handle 3 is connected outside of the wheels 1, and by means of which handle the device is to be moved over the ground.

Loose on shaft 2 between the wheels 1 my improved driving gear 4 is mounted, and is made with circular enlargements 5 and 6 respectively, at its opposite sides, serving to space the central enlarged toothed portion of the gear from the traction wheels, and provide ample space for the casing 7 hereinafter described.

The circular enlargement 6 is recessed and provided with a central ratchet wheel 8, and an internal ratchet rim 9, with both of which a gravity controlled dog 10 is adapted to engage. This dog 10 is mounted to move between fixed ears 11 on one of the traction wheels 1, and as will be seen particularly in Fig. 3, when the dog is in the position shown in this figure, which will engage the ratchet rim 9, that when in a position above the ratchet wheel 8, it will engage the latter. In either event, the dog will compel the gear 4 to turn with the traction wheels when the latter are moving forwardly, but will ride freely over the ratchet teeth during any retrograde movement of the wheels, thus compelling the gear to turn only when the device is moving forwardly as in normal operation.

The casing 7 above referred to constitutes a housing for the gear 4, and also for an idle gear 12 meshing with the gear 4 and in rear thereof, and also house a driven gear 13, which latter is fixed to a shaft 14 projecting out beyond both sides of the casing. One side 15 of the casing is made removable, and secured by means of screws or bolts 16, whereby quick access may be had to the gears within the casing when desired.

A bracket 17 is secured to the rear end of casing 7, and is made with a vertical sleeve 18, in which a forked journal 19 is mounted, and carried by a caster wheel 20.

A set screw 21 in the sleeve 18 serves to secure the journal 19 at various vertical adjustments to regulate the depth of cultivation, as will more fully appear, and a link 22 connects the handle 3 with casing 7, so that the operator can, by pressure downward on the handle, compel the cultivators to enter the ground as far as permitted by the caster wheel 20.

The shaft 14 which projects outwardly beyond the sides of casing 7, is made smooth for a distance to receive the hub portions 23 of the gangs of cultivator teeth 24, which latter are arranged in circular series around the hub portions, and provided with shovels 25 at their ends. These hub portions 24 are preferably keyed to the shaft 14, and the latter, which projects beyond the hub portions of the gangs of cultivator teeth above mentioned, is screw threaded to its outer ends, and additional gangs of cultivator teeth having internal screw threaded hubs may be screwed upon the shaft as shown in Fig. 4, and be tightly held by nuts 26. In fact the nuts 26 are employed, even when the outer gangs are dispensed with as shown in Fig. 2, so as to prevent any possibility of movement of the gangs with relation to the shaft.

It will of course, be understood, that the screw threads of the shaft and the hubs will be so arranged, that the engagement of the cultivator teeth with the ground will tend to tighten the hubs on the shaft.

In operation, the device is pushed over the ground causing wheels 1 to turn gear 4, and the latter, through the medium of the idle gear 12, revolves gear 13 and shaft 14, revolving the gangs of cultivator teeth and effectually cultivating the soil.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:—

1. In a cultivator, the combination with traction wheels, of a shaft supported in said wheels, a handle connected with said shaft, a chain of gearing driven by said shaft, a casing inclosing said chain of gearing, a driven shaft connecting the said chain of gearing, toothed cultivators secured on said driven shaft at opposite sides of the casing, a caster wheel having vertically adjustable connection with said casing, and means connecting said casing with said handle, whereby when said handle is pressed downward, downward pressure will be applied to said cultivators.

2. In a cultivator, the combination with traction wheels, of a shaft supported in said wheels, a handle connected with said shaft, a drive gear loose on said shaft, ratchet means connecting said gear and one of said wheels, a driven gear, a shaft secured in said driven gear, an idle gear connecting said driven gear with said first mentioned or drive gear, and gangs of cultivator teeth secured on said last mentioned shaft at opposite sides of said driven gear, and a casing inclosing all of said gears, a bracket secured to the rear end of said casing, a caster wheel mounted in said bracket, and means for adjusting said caster wheel vertically.

3. In a cultivator, the combination with a manually propelled pair of traction wheels, a shaft supported in said wheels, a gear loose on said shaft, ratchet means connecting said gear with one of said traction wheels, a driven gear, an idle gear connecting said first mentioned gear with the driven gear, a shaft secured in said driven gear and projecting out beyond the same at both sides, and having screw threaded ends, gangs of cultivator teeth having hubs keyed to said last mentioned shaft at opposite sides of the driven gear, other gangs of cultivator teeth having internally screw threaded hubs screwed on the threaded ends of said shaft, and nuts secured on the said shafts against said hubs.

4. In a cultivator, the combination with traction wheels, of a shaft supported in said wheels, a handle connected with said shaft, a drive gear loose on said shaft, ratchet means connecting said gear and one of said wheels, a driven gear, a shaft secured in said driven gear, an idle gear connecting said driven gear with said first mentioned or drive gear, gangs of cultivator teeth secured on said last mentioned shaft at opposite sides of said driven gear, a casing inclosing all of said gears, a bracket secured to the rear end of said casing, a caster wheel mounted in said bracket, and means for adjusting said caster wheel vertically, handles connecting said first mentioned shaft and projecting upwardly and rearwardly therefrom, and a link connecting said handle with said casing.

In testimony whereof I have signed my name to this specification in the presence of two subscribing witnesses.

JOHN HOBSON, Jr.

Witnesses:
R. H. KRENKEL,
J. A. L. MULHALL.